United States Patent
Baker et al.

(10) Patent No.: US 7,592,389 B2
(45) Date of Patent: Sep. 22, 2009

(54) CONDUCTIVE POLYMERIC STRUCTURES CONTAINING GRAPHITE NANOFIBERS HAVING GRAPHITE PARALLEL TO THE GROWTH AXIS

(75) Inventors: R. Terry K. Baker, Hopkinton, MA (US); Nelly M. Rodriguez, Hopkinton, MA (US)

(73) Assignee: Catalytic Materials, LLC, Pittsboro, NC (US)

( * ) Notice: Subject to any disclaimer, the term of this patent is extended or adjusted under 35 U.S.C. 154(b) by 610 days.

(21) Appl. No.: 11/126,755

(22) Filed: May 11, 2005

(65) Prior Publication Data

US 2005/0250895 A1 Nov. 10, 2005

Related U.S. Application Data

(63) Continuation-in-part of application No. 10/969,129, filed on Oct. 18, 2004, which is a continuation-in-part of application No. 09/902,113, filed on Jul. 10, 2001, now abandoned, which is a continuation-in-part of application No. 09/659,441, filed on Sep. 8, 2000, now Pat. No. 6,537,515, application No. 11/126,755, which is a continuation-in-part of application No. 10/015,353, filed on Dec. 11, 2001, now Pat. No. 6,953,562.

(51) Int. Cl.
*C08K 3/04* (2006.01)
*D01F 9/12* (2006.01)

(52) U.S. Cl. .................... 524/496; 524/495; 423/447.1; 423/447.2; 423/448; 977/778

(58) Field of Classification Search .............. 423/447.1, 423/447.2, 448; 524/495, 496; 977/778
See application file for complete search history.

(56) References Cited

U.S. PATENT DOCUMENTS

| 5,149,584 | A | | 9/1992 | Baker et al. |
| 5,413,866 | A | | 5/1995 | Baker et al. |
| 5,458,784 | A | | 10/1995 | Baker et al. |
| 5,618,875 | A | * | 4/1997 | Baker et al. .................. 524/495 |
| 5,653,951 | A | * | 8/1997 | Rodriguez et al. .......... 423/439 |
| 6,143,689 | A | | 11/2000 | Moy et al. |
| 6,159,538 | A | | 12/2000 | Rodriguez et al. |
| 6,537,515 | B1 | | 3/2003 | Baker et al. |
| 6,953,562 | B2 | | 10/2005 | Baker et al. |
| 2005/0135988 | A1 | | 6/2005 | Baker et al. |

OTHER PUBLICATIONS

Wong et al., Covalently functionalized nanotubes as nanometre-sized probes in chemistry and biology, Jul. 2, 1998, Nature, vol. 394, 52-55.*

N.M. Rodriguez, et al; Promotional Effect of Carbon Monoxide on the Decomposition of Ethylene Over an Iron Catalyst; Journal of Catalyst 144, 93-108 (1993); Academic Press.

(Continued)

*Primary Examiner*—Jerry Lorengo
*Assistant Examiner*—Kevin M Johnson
(74) *Attorney, Agent, or Firm*—Henry E. Naylor

(57) ABSTRACT

Electrically conductive polymer composite materials comprised of: a) an effective amount of substantially crystalline graphitic carbon nanofibers comprised of graphite sheets that are substantially parallel to the longitudinal axis of the nanofiber, preferably wherein said graphite sheets form a multifaceted tubular structure; and b) a polymeric component.

9 Claims, 2 Drawing Sheets

OTHER PUBLICATIONS

"Morphology and Crystalline Order in Catalytic Carbons", M. Audier, A. Oberline and M. Oberlin, Carbon, vol. 19, pp. 217-224, 1981.

O.C. Carneiro et al., Decomposition of CO-H2 over Graphite Nanofiber-Supported Iron and Iron-Copper Catalysts; J. Phys. Chem. B 2004, 108, 13307-13314.

* cited by examiner

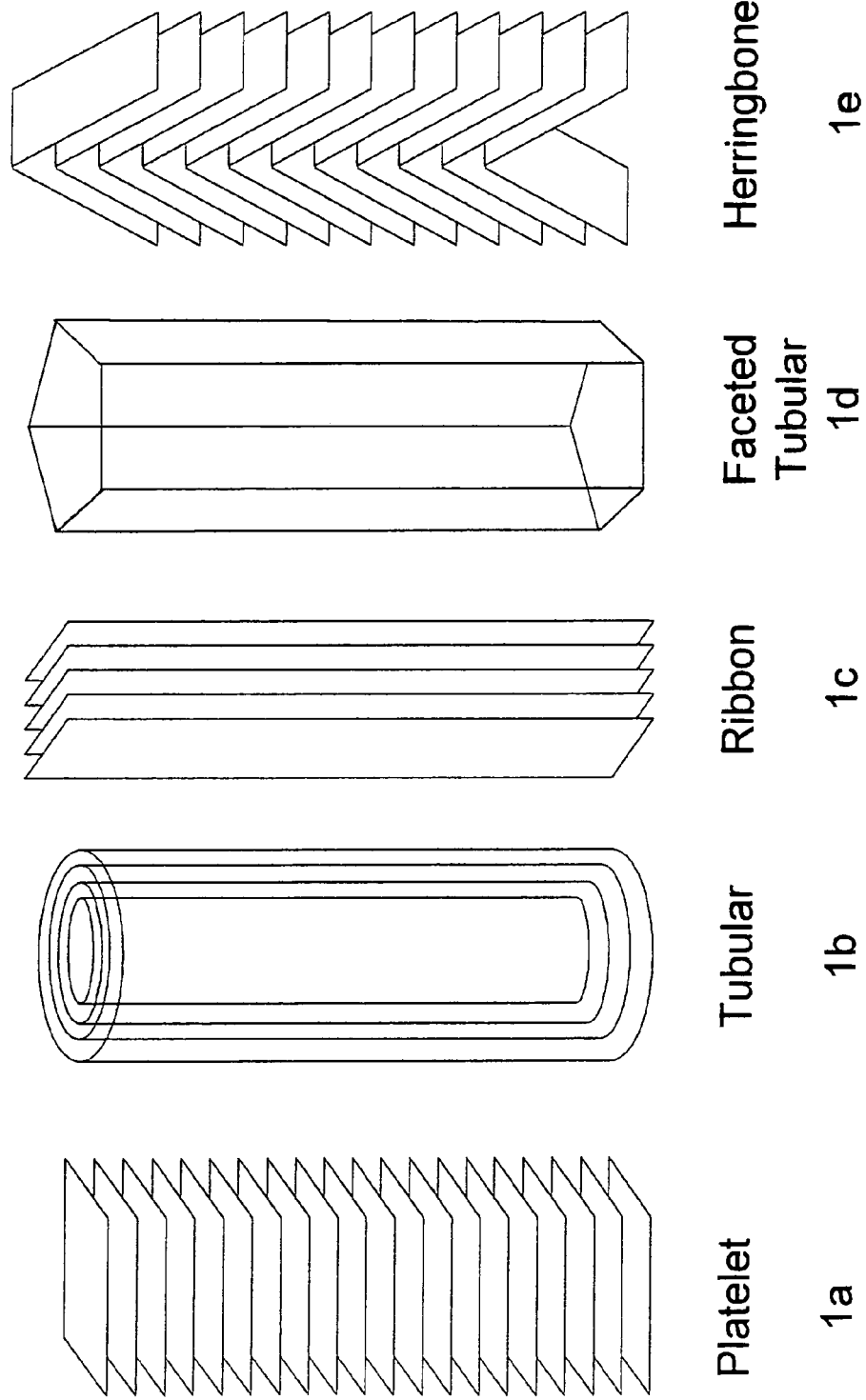

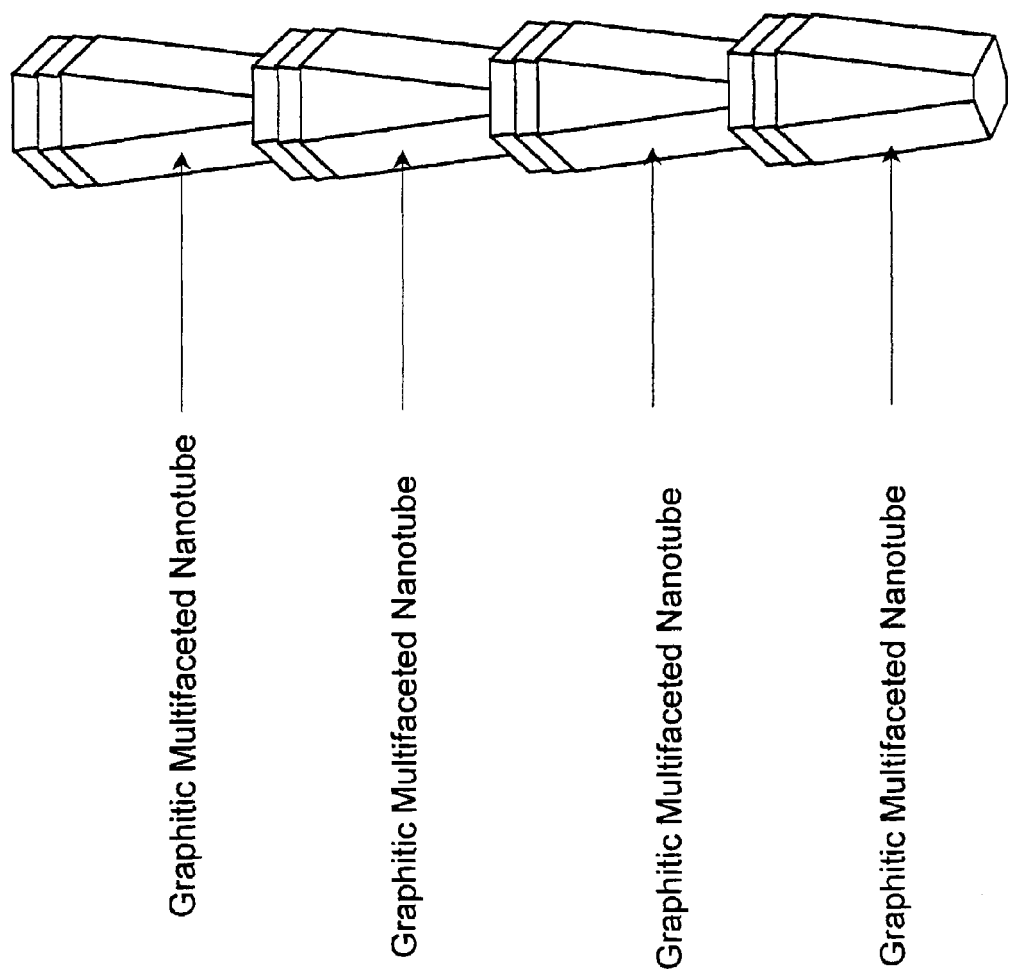

CONDUCTIVE POLYMERIC STRUCTURES CONTAINING GRAPHITE NANOFIBERS HAVING GRAPHITE PARALLEL TO THE GROWTH AXIS

CROSS-REFERENCE TO RELATED APPLICATIONS

This application is a continuation-in-part of U.S. Ser. No. 10/969,129, which was filed on Oct. 18, 2004, which was a continuation-in-part of U.S. Ser. No. 09/902,113 filed Jul. 10, 2001, which is a continuation-in-part of U.S. Ser. No. 09/659,441 filed Sep. 8, 2000. This is also a continuation-in-part of U.S. Ser. No. 10/015,353 filed Dec. 11, 2001.

FIELD OF THE INVENTION

This invention relates to electrically conductive polymer composite materials comprised of: a) an effective amount of substantially crystalline graphitic carbon nanofibers comprised of graphite sheets that are substantially parallel to the longitudinal axis of the nanofiber, preferably wherein said graphite sheets form a multifaceted tubular structure; and b) a polymeric component.

DESCRIPTION OF RELATED ART

It is well established that the incorporation of certain types of carbon nanofibers into polymeric materials can impart electrical conductivity to such materials that are generally regarded as insulators. Carbon nanofibers can be dispersed in a polymer by various well-known techniques such as melting and kneading to form an admixture that can be subsequently shaped to form an electrically conductive article. The use of conductive nanofibers is highly desirable since a given weight of such a material generates a large number of contact points within a polymer matrix. The widespread interest in electrically conductive polymers is stimulated by the possibility that such materials can have utility in such things as semiconductor chips, integrated circuits, lightweight battery components, sensors, electro-chromic displays, anti-static coatings, static dissipation, electromagnetic and radio-frequency interference shielding, fuel hoses, connectors and packaging items.

Various types of carbon nanofibers have been suggested as being suitable for use as conductive filler components for polymeric materials. For example, U.S. Pat. Nos. 4,663,230, 5,618,875 and 5,908,585 teach of the use of incorporating fibrils and carbon filaments (also known as carbon nanofibers) into polymeric matrices to render the composite materials electrically conductive. Chemical, physical and electrical advantages resulting from chemical functionalization of the surfaces of carbon nanotubes prior to imbedding the nanofibers into a polymer matrix are disclosed in U.S. Patent Application 20030089893. All of the above patents and patent application are incorporated herein by reference.

Thermoplastics such as nylons, polyethylenes, polypropylenes, polyvinylchlorides and polyesters that contain conventional particulate conductive fillers such as carbon black, metal or metal oxide powders are difficult to extrude and draw into a fiber. The ability to decrease the percent weight of filler in the resulting polymer fiber without sacrificing electrical conductive properties can be achieved by substituting carbon nanofibers for such conventional powdered additives. Because of their high aspect ratio (length/diameter) of about 100 to 1000, carbon nanofibers contact each other over a much larger surface area than the spherically shaped conventional powdered particles for a given loading. Such a material, however, suffers from the fact that while the bulk properties of the polymer exhibit high electrical conductivity, the poor contact of the conductive component with the exposed polymer surface results in a significantly lower electrical conductivity in those regions. Measurements performed on polymer composites containing metal coated carbon fibers indicate that the surface conductivity is between $10^3$ to $10^5$ times lower than that of the bulk conductivity ("Conductive Polymers and Plastics in Industrial Applications" {Larry Ruppercht Editor} Society of Plastics Engineers page 149, (1999).

Nanostructured materials, particularly carbon nano-structured materials, are quickly gaining importance for various potential commercial applications. Such applications include their use to store molecular hydrogen, to serve as catalyst supports, as reinforcing components for polymeric composites, and for use in various types of batteries. Carbon nanostructured materials are generally prepared from the decomposition of carbon-containing gases over selected catalytic metal surfaces at temperatures ranging from about 450° C. to about 1200° C.

U.S. Pat. No. 6,537,515 to Catalytic Materials, LLC teaches a method for producing a substantially crystalline graphite nanofiber comprised of graphite platelets that are aligned substantially perpendicular to the longitudinal axis of the nanofiber. Further U.S. Pat. Nos. 4,663,230 and 5,165,909 teach carbon "fibrils" that are substantially cylindrical nanotubes. All of the above patents are incorporated herein by reference.

Audier, Oberlin, Oberlin, Coulon and Bonnetain (Carbon 19, 217 (1981) teach the formation of 3-D "tubes" from the decomposition of CO over Fe—Ni (25:75) and Fe—Co (50:50) alloys at temperatures of 550° C. and 600° C., respectively. It is stated in that paper that the nanotubes are conical in shape, however, no definitive evidence is presented to substantiate this claim.

While various carbon nanostructures and their uses are taught in the art, there is still a need for improvements before such nanostructured materials can reach their full commercial and technical potential. For example, for the most part, the ultimate purity of a given type of carbon nanostructure has been limited because of the propensity for the formation of other types of undesirable carbon forms.

SUMMARY OF THE INVENTION

In accordance with the present invention there is provided a polymer composite comprised of a polymer matrix and an effective amount of substantially crystalline graphitic nanofibers consisting essentially of substantially graphite discontinuous sheets that are substantially parallel to the longitudinal axis of the nanofiber, wherein the distance between graphite sheets is from about 0.335 nm to about 0.67 nm, and having a crystallinity greater than about 95%, wherein each of said graphite sheets are separate face-to-face sheets, not bonded to each other, which sheets are aligned substantially parallel to each other. This graphite nanofiber is sometimes referred to herein as a "ribbon" structure.

In another embodiment the substantially crystalline graphitic nanofibers are comprised of at least one uninterrupted (or unbroken) substantially graphite sheet that is aligned substantially parallel to the longitudinal axis of the nanofiber and which has a substantially non-cylindrical multifaceted tubular structure. When two or more of such sheets are present, they are in the form of a tube within a tube structure having a distance between graphite sheets of about 0.335 nm to about 0.67 nm. The substantially crystalline graphitic nanofiber have a crystallinity greater than about 95%.

In a preferred embodiment, the distance between the graphite sheets is from about 0.335 and 0.40 nm.

BRIEF DESCRIPTION OF THE DRAWINGS

FIG. 1a is a representation of a platelet carbon nanofiber, which is comprised of substantially graphite sheets that are substantially perpendicular to the longitudinal axis, or growth axis, of the nanofiber.

FIG. 1b is a representation of a cylindrical carbon nanostructure that is comprised of continuous carbon sheets and is in the form of tube within a tube within a tube and having a substantially hollow center.

FIG. 1c is a representation of a ribbon carbon nanofiber of the present invention that is comprised of non-connected graphitic sheets that are aligned face-to-face and substantially parallel to the longitudinal axis of the nanofiber.

FIG. 1d is a representation of a faceted tubular carbon nanofiber of the present invention and is comprised of continuous sheets of graphic carbon but having multifaceted flat faces. The graphitic sheets are also substantially parallel to the longitudinal axis of the nanofiber.

FIG. 1e is a representation of a herringbone carbon nanofiber wherein the graphitic platelets or sheets are at an angle to the longitudinal axis of the nanofiber.

FIG. 2 hereof is a rough representation of the primary features of the carbon non-cylindrical nanotubes produced in accordance with the present invention. It shows a non-cylindrical multi-faceted tubular structure containing a substantial number of corner sites growing from a metal catalyst particle. The multi-faceted tubular nanostructure also shows a tube within a tube structure.

DETAILED DESCRIPTION OF THE INVENTION

The carbon nanofibers of the present invention possess novel structures in which graphite sheets, constituting the nanostructure, are aligned in a direction that is substantially parallel to the growth axis (longitudinal axis) of the nanofiber. There are two types of such graphite nanofibers of the present invention. One type, which is sometimes referred to herein as the "ribbon" structure, is comprised of a plurality of discontinuous graphite sheets. That is, they are not bonded or connected along their long edges, but are instead aligned substantially face-to-face with each sheet next to it. The "ribbon" structure can be thought of as having sheets comprised of a first face and a second face and wherein they are aligned face-to-face along the longitudinal axis of the nanofiber. A general representation of the "ribbon" nanostructure is shown in FIG. 1c hereof. The other type of nanofibers of the present invention are those referred to as "multi-faceted" substantially non-cylindrical tubular nanofibers. Such multi-faceted tubular nanofibers can be single or multi-walled, preferably multi-walled. By multi-walled we mean that the structure can be thought of as multi-faceted tube within a multi-faceted tube, etc. The multi-faceted tubular carbon nanostructures of the present invention are distinguished from the so-called "fibrils" or cylindrical carbon nanostructures. The multi-faceted tubular nanofibers of the present invention can be thought of as having a structure that resembles a multi-faceted pencil or Alan key. That is, a cross section of the multifaceted nanotube would represent a polygon. A single wall of the multifaceted nanotubes of the present invention can also be thought of as being a single sheet folded in such a way to resemble a multifaceted tubular structure—the folds being the corners. Further, the surface area of the carbon nanofibers can be increased by careful activation with a suitable etching agent, such as carbon dioxide, steam, or the use of a selected catalyst, such as an alkali or alkaline-earth metal.

The terms "carbon nanofibers", "graphite nanofibers", "carbon nanostructures", and "graphite nanostructures" are sometimes used interchangeably herein. The carbon nanofibers of the present invention have a unique set of properties, that includes: (i) a nitrogen surface area from about 40 to 300 $m^2/g$; (ii) an electrical resistivity of 0.4 ohm•cm to 0.1 ohm•cm; (iii) a crystallinity from about 95% to 100%; and (iv) a spacing between adjacent graphite sheets of 0.335 nm to about 1.1 nm, preferably from about 0.335 nm to about 0.67 nm, and more preferably from about 0.335 to about 0.40 nm.

Catalysts used to prepare the carbon nanofibers of the present invention are bulk metals in powder form wherein the metal is selected from the group consisting of iron, iron-copper bimetallics, iron-nickel bimetallics and also cobalt-magnesium oxide mixtures. It is well established that the ferromagnetic metals, iron, cobalt, and nickel, are active catalysts for the growth of carbon nanofibers during decomposition of certain hydrocarbons or carbon monoxide. Efforts are now being directed at modifying the catalytic behavior of these metals, with respect to nanofiber growth, by introducing other metals and non-metals into the system. In this respect, copper is an enigma, appearing to be relatively inert towards carbon deposition during the $CO/H_2$ reaction. Thus, it is unexpected that Fe or the combination of Cu or Ni with Fe has such a dramatic effect on carbon nanofiber growth in the $CO/H_2$ system in the temperature range of about 550° C. to about 725° C. Preferably from about 650° C. to about 725° C., more preferably from about 670° C. to about 725° C., and most preferably 625° C. to about 700° C. (iron-nickel and iron-copper). For the cobalt-magnesium oxide system the preferred temperature range is 580° C. to about 600° C. Iron-nickel catalysts and cobalt-magnesium oxide are preferred for preparing the carbon nanostructures of the present invention.

The average powder particle size of the metal catalyst will range from about 0.25 nanometers to about 5 micrometer, preferably from about 1 nanometer to about 3 micrometers and more preferably from about 2.5 nanometers to about 1 micrometer. When the catalyst is a bimetallic catalyst, the ratio of the two metals can be any effective ratio that will produce substantially crystalline carbon nanofibers in which the graphite sheets are aligned substantially parallel to the longitudinal axis of the nanofiber, at temperatures from about 550° C. to about 725° C. in the presence of a mixture of $CO/H_2$. The ratio of iron to either copper or nickel will typically be from about 1:99 to about 99:1, preferably from about 5:95 to about 95:5, more preferably from about 2:8 to about 8:2; and most preferably from about 6:4 to about 8:2. The bimetallic catalyst can be prepared by any suitable technique. One preferred technique is by co-precipitation of aqueous solutions containing soluble salts of the two metals. Preferred salts include the nitrates, sulfates, and chlorides of iron, copper, and nickel particularly the nitrates. The resulting precipitates are dried and calcined to convert the salts to the mixed metal oxides. The calcined metal powders are then reduced at an effective temperature and for an effective time.

Carbon nanostructures of the present invention are generally prepared by reacting the powdered catalyst in a heating zone with the vapor of a suitable carbon-containing compound. While the art teaches a wide variety of carbon-containing compounds as being suitable for the preparation of carbon nanostructures, the inventors hereof have found that only a mixture of CO and $H_2$ will yield carbon nanofibers with unexpected high crystallinities in the unique structures of nanofibers of the present invention in the temperature range of about 550° C. to about 725° C. That is, crystallinities greater than about 95%, preferably greater than 97% more preferably greater than 98%, and most preferably substantially 100%.

After the nanofibers are grown, it may be desirable to treat them with an aqueous solution of an inorganic acid, preferably a mineral acid, to remove excess catalyst particles. Non-limiting examples of suitable mineral acids include sulfuric acid, nitric acid, and hydrochloric acid. Preferred is hydrochloric acid.

It is within the scope of this invention to increase the spacing between the graphite sheets by any suitable means, such as by intercalation. Intercalation involves incorporating an appropriate intercalation compound between sheets. Intercalation compounds suitable for graphite structures are comprehensively discussed in *Applications of Graphite Intercalation Compounds*, by M. Inagaki, Journal of Material Research, Vol 4, No. 6, November/December 1989, which is incorporated herein by reference. The preferred intercalation compounds for use with the nanofibers of the present invention are alkali and alkaline-earth metals. The limit to which the spacing of the graphite sheets will be increased for purposes of the present invention will be that point wherein the carbon nanofibers no longer can be characterized as graphitic. That is, at the point wherein the spacing between sheets becomes so large that the carbon now has properties different than those of graphite. In most cases, the electro-conductivity is enhanced. It is important for the practice of the present invention that the carbon nanofibers maintain the basal plane structure representative of graphite.

A major advantage of the graphite nanofibers of the present invention over other graphitic materials is their flexibility with regard to modification of surface chemistry. For example, the carbon nanostructures of the present invention, primarily because they are not cylindrical, contain a substantial number of corner sites, which are also referred to as edge regions. The edge regions of the nanostructures of the present invention can be made either basic (introduction of $NH_4^+$ groups) or acidic (addition of $COOH^-$ groups) by use of any suitable method. Furthermore, the presence of oxygenated groups (hydroxyl, peroxide, ether, keto or aldehyde) that are neither acidic nor basic in nature can impart polarity to the graphite structure. These groups in turn can react with organic compounds to form unique structures for separations. Polar groups will promote the interaction of carbon corner atoms with other polar groups such as water. As a consequence, the interaction of graphitic materials with aqueous solutions can be greatly enhanced due to the presence of acid, basic or neutral functionality.

The distribution of polar groups in active carbon (non-graphitic) occurs in a random fashion, whereas for the graphitic nanofibers of the present invention, such sites are located at the edges of the graphene layers. Addition of oxygenated groups can be achieved by selected oxidation treatments including treatment with peroxides, nitric acid, ozone, potassium permanganate, etc. Functionality can also be incorporated by electrochemical oxidation, at for example 2.3 volts for various periods of time. The nature of the groups will be dependent upon the oxidation time and the voltage. Polar sites can also be eliminated by reduction, out-gassing in vacuum at 1000° C. or treatment in hydrazine at about 35° C. Following this procedure, the graphite nanofiber will become hydrophobic. The possibility of controlling the functionality of the graphite surface can have a direct impact on both the chemistry of the supported metal particles and their morphological characteristics.

The particular polymeric material used in the practice of the present invention is not critical. Typically, it will be chosen in accordance with the structural, strength, design, etc., parameters desirable for the given application. A wide range of polymeric resins, natural or synthetic, can be used. The polymeric resins are carbonizable or non-carbonizable, often non-carbonizable. These include thermoplastics, thermosets, and elastomers. Suitable synthetic polymeric resins include, but are not limited to, nylons, polyethylene, polypropylene, polyvinyl chloride, styrenics, polyurethanes, polyimides, polycarbonates, polyamides, polyethylene terephthalate, polytetrafluoroethylene, acrylics, phenolics, unsaturated polyesters, etc. Suitable natural polymers can be derived from a natural source, i.e., cellulose, gelatin, chitin, polypeptides, polysaccharides, or other polymeric materials of plant, animal, or microbial origin.

The polymeric materials can contain other conventional ingredients and additives well known in the field of polymers to provide various desirable properties. Typically, these other substances are contained in their conventional amounts, often less than about 5 weight percent. Similarly, the polymeric materials can be crystalline, partially crystalline, amorphous, cross-linked, etc., as may be conventional for the given application.

The amount of graphite nanofibers in the polymer composite of the present invention will typically be in the range of 0.001 to 15 weight percent based on the amount of polymer, preferably 0.01 to 5 weight percent, most preferably 0.1 to 1.5 weight percent. The nanofibers typically are dispersed essentially homogeneously throughout the bulk of the polymeric material but can also be present in gradient fashion, increasing or decreasing in amount (e.g. concentration) from the external surface toward the middle of the material or from one surface to another, etc. In addition, the nanofibers can be dispersed only in an external or internal region of the material, e.g., forming in essence an external skin or internal layer. In all cases, the amount of graphite nanofibers will be chosen to be effective for the desired electromagnetic shielding and/or electrical conductive effect in accordance with the guidance provided in this specification. Aligned, oriented, disentangled, and/or arrayed nanofibers of appropriate effective aspect ratio in a proper amount mixed with a polymer can be synthesized to meet the desired properties of the end product. At most, a few routine parameteric variation tests may be required to optimize amounts for a desired purpose. Appropriate processing control for achieving a desired array of graphite nanofibers with respect to the plastic material can be achieved using conventional mixing and processing methodology, including but not limited to, conventional extrusion, multi-dye extrusion, press lamination, etc. methods or other techniques applicable to incorporation of nanofibers into a polymer such as a thermoset resin, e.g., methods for preparing interlaminate adhesive and/or shielding layers.

The polymer composite of the present invention can be utilized in essentially any form in which the underlying polymeric material is suitable, e.g., including fibers, cylinders, plaques, films, coatings, sheets, molding or extrusion compounds, and essentially any other form or shape, depending on the configuration and desirable properties of the base host resin system and the application. Thus, the composite of the present invention can be incorporated as chopped or continuous fibers, woven material, non-woven material, clothing, material formed by electro-spinning or melt spinning processes, paints, elastomeric materials, non-elastomeric materials, etc. As an example, an entangled mesh of graphite nanofibers can be compounded into a polymer matrix and the resulting composite can then be processed by conventional plastics processing techniques, such as injection molding and in accordance with this invention.

Typically, thicknesses of the composites of this invention which achieve satisfactory conductivity properties can be lower than 1 mm. Depending on the conductive environment anticipated for the application, the loading and structural form of the composite will ultimately determine the useful thickness of the composite. Much thicker conductive composites can also be made according to this invention, with the upper limit defined by the limitations of the base polymers and/or processing techniques the polymeric material which contain graphite nanofibers and, thus, are not necessarily the same as the average thickness of the material. It is also possible to have more than one region within a given composite which contains nanofibers, e.g., alternating with layers essentially free of graphite nanofibers, all layers being of variable thicknesses or the same thickness.

The present invention will be illustrated in more detail with reference to the following examples, which should not be construed to be limiting in scope of the present invention.

The multifaceted graphite nanotubes used in the following examples were prepared from the decomposition of carbon monoxide/hydrogen (9:1) mixtures over Co/MgO powdered catalysts at 600° C., according to the procedure described in U.S. Ser. No. 20030108479 (allowed September 2004. The mixed metal oxide catalyst, $Co_xMg_yO$ (x:y=0.6:1), was calcined at 500° C. to 850° C., reduced in $H_2$ at 850° C. and subsequently reacted in a $CO/H_2$ (9:1) mixture at 600° C. for 2.0 hours to produce multi-faceted graphitic nanotubes. The catalyst pre-treatment steps and the growth of nanotubes were performed in a horizontal quartz reactor tube contained within a Lindberg furnace. MKS mass flow controllers regulated the respective gas flow rates. Cylindrical carbon nanotubes were generated in a similar apparatus from the decomposition of ethylene/hydrogen (1:2) over a Fe—Mo/γ-$Al_2O_3$ catalyst at 680° C. according to the procedure described in U.S. Pat. No. 6,143,689 to Moy. Prior to use, all nanotubes were treated in dilute mineral acid for a period of one week to remove the associated metal catalyst particles.

The gases used in these examples were carbon monoxide (99.9%), ethylene (99.95%); hydrogen (99.999%), helium (99.99%) and argon (99.99%) were purchased from Air Products and dried before use. Reagent grade iron nitrate, cobalt nitrate, molybdenum nitrate, □-alumina and magnesium oxide were used in the preparation of catalysts for nanotube growth and were obtained from Fisher Scientific. X-ray diffraction measurements of the nanotubes were performed in a Rigaku Multiflex diffractometer with monochromatized Cu K□ radiation. Using this technique it was possible to determine the degree of crystalline perfection of the two types of nanotubes by comparison of the data with that obtained from a standard sample of high-purity single crystal graphite. Transmission electron microscopy studies were carried out with a JEOL 2000EXII instrument equipped with a high-resolution pole piece capable of giving a lattice resolution of 0.18 nm. Using this approach it was possible to observe nanotubes where the termination of growth was perpendicular to the plane of the specimen. Under these circumstances one is able to look down the tip of the structure and ascertain the 3-dimensional characteristics of the material. From examination of many nanotubes it was possible to confirm that material made from the Co/MgO—$CO/H_2$ system adopted a faceted hexagonal arrangement similar to an "Alan-key". In contrast, the nanotubes grown from the decomposition of $C_2H_4/H_2$ over Fe—Mo/g-$Al_2O_3$ catalyst exhibited a circular cross-section. Electrical resistivity measurements were carried by the four-point probe method.

EXAMPLE 1

A powered bimetallic catalyst comprised of Fe—Ni (6:4) was reacted in $CO/H_2$ at various temperatures shown in Table I below ranging from 450° C. to 750° C. The resulting graphite nanofibers showed distinct differences in their structural characteristics. The graphite nanofibers generated at temperatures from about 625° C. to 725° C. were found to be comprised of a structure in which the graphite sheets were aligned in direction substantially parallel to the longitudinal fiber axis and adopted a multi-faceted cross-sectional geometry. As the temperature was raised to 750° C. the tendency for graphite shells to be formed increased.

TABLE I

| Temperature (° C.) | Characteristics of Solid Carbon Product |
|---|---|
| 400 | A few spiral nanofibers having a "herring-bone" structure |
| 450 | A few spiral nanofibers having a "herring-bone" structure |
| 500 | Some bi-directional spiral nanofibers having a "herring-bone" structure |
| 550 | Some bi-directional spiral nanofibers having a "herring-bone" structure |
| 600 | Mixture of spiral nanofibers and multi-faceted nanotubes |
| 625 | Only multi-faceted nanotubes present |
| 650 | Only multi-faceted nanotubes present |
| 700 | Only multi-faceted nanotubes present |
| 725 | Multi-faceted nanotubes present with a few graphite shells |
| 750 | Multi-faceted nanotubes and graphite shells present |

EXAMPLE 2

Comparison of the Chemical and Physical Properties of Multi-faceted Multi-walled Nanotubes (MWNT) and Cylindrical MWNT A series of experiments was carried out to compare the chemical and physical properties of cylindrical MWNT and multi-faceted MWNT. Table II below shows the results of these experiments.

TABLE II

| | Multi-faceted MWNT | Cylindrical MWNT |
|---|---|---|
| Surface Area ($m^2/g$) | 178 | 297 |
| Average Width (nm) | 11.6 | 18 |
| $d_{002}$ XRD (nm) | 0.336 | 0.354 |
| Conductivity (Ω.cm) | $7.7 \times 10^{-2}$ | $3.2 \times 10^{-2}$ |
| Onset $CO_2$ Reactivity (° C.) | 650 | 860 |

Inspection of these data evidences the existence of substantial differences between these two types of MWNT. It is quite probable that the variation in surface areas is merely a reflection of the difference in the relative widths of the two structures, with the cylindrical MWNT being the smaller, since they are generated from a supported metal catalyst rather than a bimetallic powder.

There is a 5% difference in the spacing of adjacent graphite layers with multi-faceted MWNT being very close to high purity graphite (0.335 nm). The higher value exhibited by the cylindrical MWNT is believed to be a result of the curvature of the graphite planes in these materials.

The higher degree of graphitic nature of multi-faceted MWNT is also evident from the electrical conductivity measurements as well as the X-ray diffraction analysis, 0.336 nm versus 0.354 nm (high purity graphite=0.335 nm). The major difference, however, is seen in the reactivity with $CO_2$. It was found that although multi-faceted MWNT exhibit high crystallinity as determined from the X-ray diffraction analysis, they have the ability to "activate" polar molecules, including $CO_2$, which can subsequently react with the multi-faceted MWNT and gasify it.

EXAMPLE 3

In this set of experiments, various amounts of the two types of carbon nanotubes were ultrasonically mixed with polymethyl methacrylate (PMMA) to produce thin composite films. The electrical surface resistivity of the resulting polymer/carbon nanotube films was determined at room temperature on similar thickness samples 1 cm×1 cm. Examination of the data presented in Table XII below shows that the polymer samples containing dispersed multi-faceted MWNT of the present invention had a resistance of about two orders of a magnitude less than the corresponding samples containing conventional cylindrical MWNT.

TABLE III

| Nanotube Loading (wt. %) | Cylindrical MWNT (Ohms/sq) | Multi-faceted MWNT (Ohms/sq) |
| --- | --- | --- |
| 2.0 | $6.7 \times 10^6$ | $7.0 \times 10^4$ |
| 4.0 | $1.5 \times 10^5$ | $6.0 \times 10^3$ |
| 8.0 | $3.6 \times 10^4$ | $9.6 \times 10^2$ |

EXAMPLE 4

In this set of experiments the two types of MWNT (5 wt. %) were dispersed in molten PET (polyethylene terephthalate) and extruded via a spinneret into polymeric fibers having a diameter of about 10 microns. The electrical volume (bulk) resistivity of the polymer/carbon nanotube fibers was determined at room temperature on samples of the same width and length. The data given in table IV below shows that the polymer fibers containing multi-faceted MWNT of the present invention had a bulk resistance of over an order of magnitude less than that of the same polymer containing conventional cylindrical MWNT.

TABLE IV

| Type of Filler | Volume Resistivity (ohm.cm) |
| --- | --- |
| Multi-faceted MWNT | $1 \times 10^5$ |
| Cylindrical MWNT | $3.8 \times 10^6$ |

EXAMPLE 5

In another set of experiments the two types of MWNT (5 wt. % loading) were dispersed in molten polycarbonate and a comparison carried out on the flow characteristics at 240° C. of the respective mixtures. This data, which is presented in Table V below, is important when considering the utility of the mixture for processes such as injection molding and extrusion to form polymer fibers. Inspection of these data clearly demonstrates that the flow ability of the molten polycarbonate containing the multi-faceted MWNT of the present invention is far superior to that of the corresponding mixture containing conventional cylindrical MWNT. Moreover, the molten mixture containing the MWNT of the present invention exhibited flow characteristics that were significantly better than the pure polymer under the same conditions.

TABLE V

| Additive to Polycarbonate | Melt Flow Rate (g/10 min) |
| --- | --- |
| 5 wt. % Multi-faceted MWNT | 20.0 |
| 5 wt. % Cylindrical MWNT | 2.1 |
| None | 5.5 |

EXAMPLE 6

Comparison of the dispersion behavior in a variety of solvents following ultrasonic agitation at room temperature was carried out on samples of the "as prepared" multi-faceted and cylindrical MWNT as a function of time. In order to obtain a quantitative measure on the dispersion characteristics of the two materials, a grading scale of 5.0 (full and stable dispersion to 0 (no dispersion) was adopted. Examination of the data presented in Table VI indicates that as the solvent becomes more covalent in nature the multi-faceted MWNT exhibit good dispersion properties. On the other hand, the cylindrical MWNT do not disperse to any significant extent in any of the solvents.

TABLE VI

| Solvent | Time in solution (hours) | Multi-faceted MWNT | Cylindrical MWNT |
| --- | --- | --- | --- |
| Water | 0 | 0 | 0 |
|  | 24 | 0 | 0 |
| Ethanol | 0 | 0 | 0 |
|  | 24 | 0 | 0 |
| Butanol | 0 | 1.0 | 0 |
|  | 24 | 0 | 0 |
| Acetone | 0 | 3.0 | 1.0 |
|  | 24 | 3.0 | 0 |
| DMF | 0 | 4.0 | 1.0 |
|  | 24 | 4.0 | 0 |

EXAMPLE 7

Comparison of the dispersion behavior in a variety of solvents following ultrasonic agitation at room temperature was carried out on samples of the pre-treated multi-faceted and cylindrical MWNT. In these experiments the samples were initially subjected to soaking in 1 M hydrochloric acid for 5 days to remove the metal catalyst particles. Following this step the demineralized materials were heated to 450° C. in air for 0.25 hours, which resulted in a weight loss of 3.3 wt. %. The same grading scale was used to ascertain the dispersion characteristics as that described in Example 6. Examination of the data presented in Table VII indicates that once again as the solvent becomes more covalent in nature the multi-faceted MWNT exhibit good dispersion properties. In contrast, the cylindrical MWNT do not disperse to any significant extent in any of the solvents.

TABLE VII

| Solvent | Time in solution (hours) | Multi-faceted MWNT | Cylindrical MWNT |
|---|---|---|---|
| Water | 0 | 0 | 0 |
|  | 24 | 0 | 0 |
| Ethanol | 0 | 0 | 0 |
|  | 24 | 0 | 0 |
| Butanol | 0 | 1.0 | 0 |
|  | 24 | 0 | 0 |
| Acetone | 0 | 3.0 | 0 |
|  | 24 | 3.0 | 0 |
| DMF | 0 | 5.0 | 1.0 |
|  | 24 | 4.0 | 1.0 |

EXAMPLE 8

Differences in the chemical properties of the two types of MWNT were studied via experiments in which the respective materials were reacted in a $CO_2/H_2$ (1:2) mixture at 475° C. for various periods of time. Examination of the data presented in Table VI below reveals that catalytic activity was only achieved with the multi-faceted MWNT under these conditions. Clearly the presence of corner sites exposed by the former structures is critical in order to achieve catalyzed dissociation of CO2 under these conditions. Since the cylindrical MWNT consist entirely of curved surfaces, no active catalytic sites are available.

TABLE VIII

| Type of Catalyst | Reaction Time (hours) | % $CO_2$ Conversion |
|---|---|---|
| Multi-faceted MWNT | 0.5 | 35.0 |
|  | 1.0 | 36.0 |
|  | 4.0 | 37.0 |
|  | 24.0 | 37.0 |
| Cylindrical MWNT | 0.5 | 0 |
|  | 1.0 | 0 |
|  | 4.0 | 0 |
|  | 24.0 | 0 |

EXAMPLE 9

Differences in the physical properties of the two types of MWNT were obtained via X-ray diffraction studies. From analysis of the X-ray patterns of the materials it was possible to obtain the $d_{002}$ spacing, which is the distance between adjacent graphite sheets in the walls of the nanotubes. From the data presented in Table IX below it is apparent that significant differences exist in the degree of crystalline perfection of the two types of MWNT. From a comparison with single crystal graphite it is clear that multi-faceted MWNT exhibits the more perfect structure.

TABLE IX

| Material | $d_{002}$ spacing (nm) |
|---|---|
| Multi-faceted MWNT | 0.3364 |
| Cylindrical MWNT | 0.3608 |
| Single Crystal Graphite | 0.3350 |

What is claimed is:

1. A composite comprised of an effective amount of: a) substantially crystalline graphitic nanofibers consisting essentially of at least one uninterrupted, unbroken, substantially graphite sheet that is aligned substantially parallel to the longitudinal axis of the nanofiber and which has a substantially non-cylindrical multifaceted tubular structure, wherein when two or more of said sheets is present they are present is a tube within a tube structure and wherein the distance between graphite sheets is from about 0.335 nm to about 0.67 nm, wherein said substantially crystalline graphitic nanofiber has a crystallinity greater than about 95%; and b) a polymeric material.

2. The composite of the claim 1 wherein the distance between the graphite sheets is from about 0.335 and 0.40 nm.

3. The composite of claim 1 wherein at least a portion of the edge regions of the nanofiber contain a functional group selected from the group consisting of basic groups, acidic groups, and oxygenated groups.

4. The composite of claim 3 wherein the functional group is a basic group that is a $NH_4+$ group.

5. The composite of claim 3 wherein the functional group is an acid group which is a $COOH^-$ group.

6. The composite of claim 3 wherein the functional group is an oxygenated group selected from the group consisting of hydroxyl, peroxide, ether, keto, and aldehyde.

7. The composite of claim 1 wherein the polymeric material is a synthetic polymeric resin selected from the group consisting of nylons, polyethylene, polypropylene, polyvinyl chloride, styrenics, polyurethanes, polyimides, polycarbonates, polyamides, polyethylene terephthalate, polytetrafluoroethylene, acrylics, phenolics, unsaturated polyesters.

8. The composite of claim 1 wherein the polymeric material is a polymer from a natural source and is selected from the group consisting of cellulose, gelatin, chitin, polypeptides, polysaccharides, or other polymeric materials of plant, animal, or microbial origin.

9. The composite of claim 1 which is in the form of a fiber, cylinder, plaques, film, coating, sheet or extruded shape.

* * * * *